(12) United States Patent
Syed et al.

(10) Patent No.: US 6,438,355 B1
(45) Date of Patent: Aug. 20, 2002

(54) METHOD AND SYSTEM FOR DETERMINISTIC CHARGING IN A SATELLITE COMMUNICATIONS SYSTEM

(75) Inventors: Inayat Syed, Fairfax, VA (US); Martin Reichelt, Plano, TX (US); Yaping Zhu, Chatenay-Malabry (FR)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/442,820

(22) Filed: Nov. 18, 1999

(51) Int. Cl.[7] .......................... H04B 7/185; H04B 1/06; H04B 7/00; H04M 11/00; H04Q 7/20
(52) U.S. Cl. ...................... 455/12.1; 455/266; 455/403; 455/434; 455/553; 379/354
(58) Field of Search .................. 379/354; 455/427, 455/566, 403, 12.1, 567, 432, 434, 266, 553

(56) References Cited

U.S. PATENT DOCUMENTS

| | | | | |
|---|---|---|---|---|
| 4,028,500 A | * | 6/1977 | McClure et al. | 379/354 |
| 4,972,455 A | * | 11/1990 | Phillips et al. | 455/434 |
| 5,020,092 A | * | 5/1991 | Phillips et al. | 455/266 |
| 5,020,093 A | * | 5/1991 | Pireh | 455/434 |
| 5,228,074 A | * | 7/1993 | Mizikovsky | 455/553 |
| 5,280,521 A | * | 1/1994 | Itoh | 455/12.1 |
| 5,918,171 A | * | 6/1999 | Funke et al. | 455/403 |
| 5,937,352 A | * | 8/1999 | Courtney et al. | 455/12.1 |
| 6,243,580 B1 | * | 6/2001 | Garner | 455/12.1 |
| 6,301,466 B1 | * | 10/2001 | Alperovich et al. | 455/12.1 |

OTHER PUBLICATIONS

Digital Cellular Telecommunications System (Phase 2+); Support of Optimal Routeing (SOR); Service Definition (Stage 1) (GSM 02.79); European Telecommunications Standards Institute (ETSI); GSM 02.79 Version 5.1.0; Nov. 1996; TS/SMG–01279QR; 9 sheets/17 pages.

Digital Cellular Telecommunications System (Phase 2+); Support of Optimal Routeing (SOR); Technical Realisation (GSM 03.79, Version 5.4.0 Release 1996); Global System for Mobile Communications; European Telecommications Standard Institute (ETSI); TS 101 045 v5.4.0 (1998–11); 21 sheets/41 pages.

* cited by examiner

Primary Examiner—William Cumming
(74) Attorney, Agent, or Firm—Jenkens & Gilchrist, P.C.

(57) ABSTRACT

A method and system enables optimal call routing in a satellite communications network when a satellite subscriber has, for example, call forwarding active. Many satellite networks re-register a satellite subscriber's (e.g., the A-subscriber's) subscription information to a satellite gateway that is most cost efficient when the satellite subscriber initiates an outgoing call. If the called party (e.g. the B-subscriber) is distant from the satellite subscriber's home country, the distant gateway to which the re-registration occurs is likely to be far from the gateway of his or her native country, which is often to where call forwarding is directed. When an incoming call from a C-subscriber is detected for the A-subscriber, the call is handled normally until call forwarding is detected in the distant gateway. Once call forwarding is detected, a satellite gateway through which the call will be completed (e.g., routed or re-registered) is determined such that, for example, the resulting call charges will be deterministic and/or equal to a normal expected value.

6 Claims, 7 Drawing Sheets

METHOD AND SYSTEM FOR DETERMINISTIC CHARGING IN A SATELLITE COMMUNICATIONS SYSTEM

BACKGROUND OF THE INVENTION

1. Technical Field of the Invention

The present invention relates in general to the field of wireless communications, and in particular, to operating a satellite communications system in conjunction with optimized call routing.

2. Description of Related Art

Mobile wireless communication is becoming increasingly important for providing safety, convenience, improved productivity, and simple conversational pleasure to subscribers of wireless communications systems. One prominent mobile wireless communication option is cellular communication. Cellular phones, for instance, can be found in cars, briefcases, purses, and even pockets. With the proliferation of cellular phone use, cellular phone subscribers are demanding increased coverage areas as well as the ability to use their cellular phones across different geographical areas, types of wireless networks, wireless network service providers, etc. One way to increase the size and geographical diversity of coverage areas is to employ satellite communication systems. These satellite communication systems may be based on any of many traditional wireless communication network standards.

Figure 1:
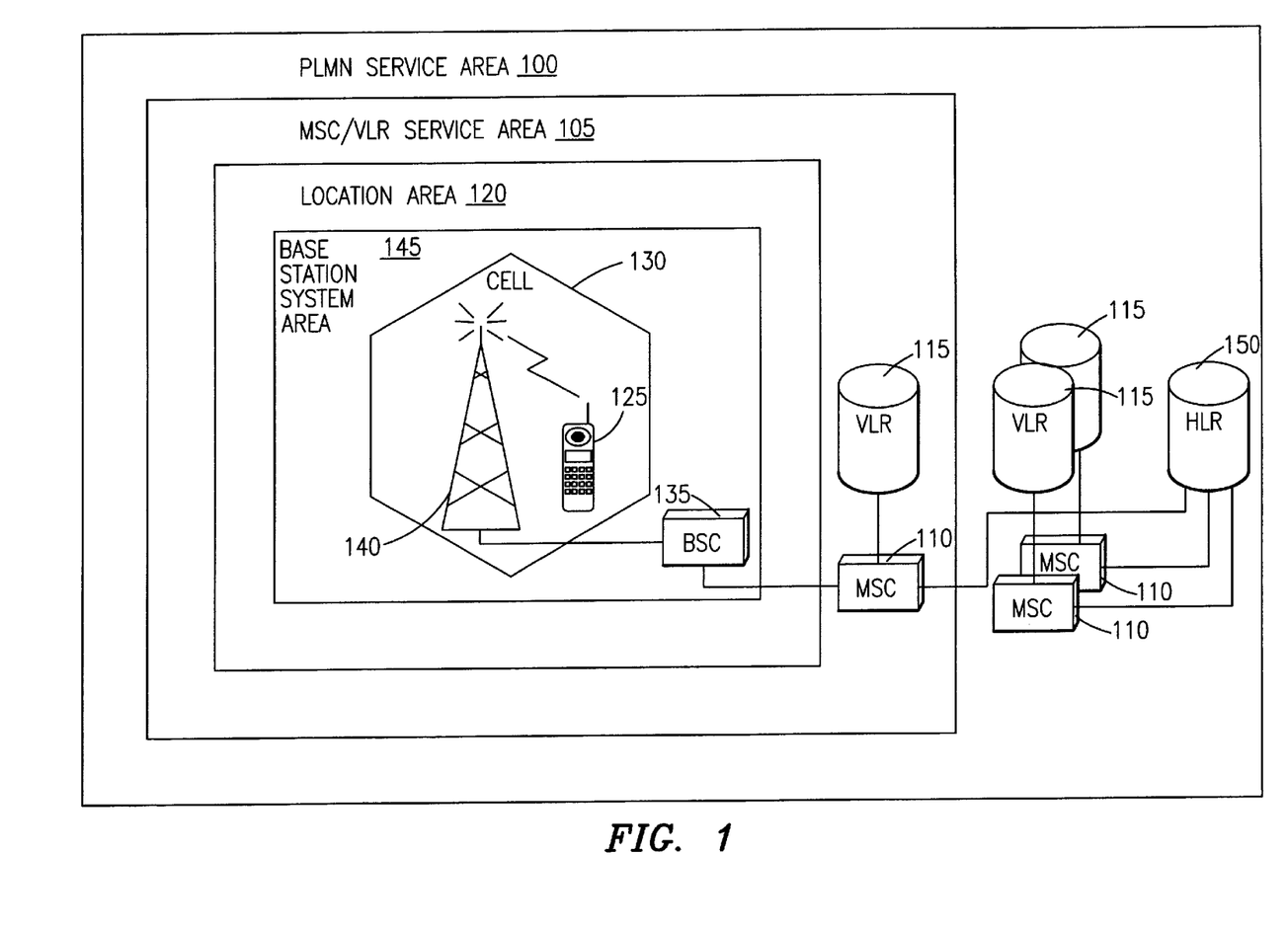
FIG. 1 illustrates an exemplary cellular wireless network, such as a Global System for Mobile Communication (GSM) Public Land Mobile Network (PLMN), which may be used in accordance with the present invention.

Referring now to FIG. 1 of the drawings, an exemplary cellular wireless communication network system, such as a Public Land Mobile Network (PLMN) 100 operating in accordance with the Global System for Mobile Communication (GSM) standard, is described. The PLMN 100 is composed of a plurality of areas 105, each with a Mobile Services Switching Center (MSC) 110 and an integrated Visitor Location Register (VLR) 115 therein. The MSC/VLR areas 105, in turn, include a plurality of Location Areas (LA) 120, which are defined as that part of a given MSC/VLR area 105 in which a Mobile Terminal (MT) 125 may move freely without having to send update location information to the MSC/VLR 110 that controls the LA 120. Each LA 120 is divided into a number of cells 130. The MT 125 is the physical equipment (e.g., a car phone, a computer with a wireless link, other portable phone, etc.) used by mobile subscribers to communicate with the cellular network 100, each other, and users outside the subscribed network, both wireline and wireless.

The MSC 110 is in communication with at least one Base Station Controller (BSC) 135, which, in turn, is in contact with at least one Base Transceiver Station (BTS) 140. The BTS 140 is the physical equipment, illustrated for simplicity as a radio tower, that provides radio coverage to the geographical part of the cell 130 for which it is responsible. It should be understood that the BSC 135 may be connected to several BTSs 140, and may be implemented as a stand-alone node or integrated with the MSC 110. In either event, the BSC 135 and the BTS 140 components, as a whole, are generally referred to as a Base Station System 145.

With further reference to FIG. 1, the PLMN Service Area or wireless network 100 includes a Home Location Register (HLR) 150, which is a database maintaining all subscriber information (e.g., user profiles, current location information, International Mobile Subscriber Identity (IMSI) numbers, other administrative information, etc.). The HLR 150 may be Column-located with a given MSC 110, integrated with the MSC 110, or alternatively can service multiple MSCs 110, the latter of which is illustrated in FIG. 1.

The VLR 115 is a database containing information about all of the MTs 125 currently located within the MSC/VLR area 105. If an MT 125 roams into a new MSC/VLR area 105, the VLR 115 connected to that MSC 110 will request data about that MT 125 from the HLR database 150 (simultaneously informing the HLR 150 about the current location of the MT 125). Accordingly, if the user of the MT 125 then wants to make a call, the local VLR 115 will have the requisite identification information without having to reinterrogate the HLR 150. In the aforedescribed manner, the VLR and HLR databases 115 and 150, respectively, contain various subscriber information associated with a given MT 125.

Figure 2:
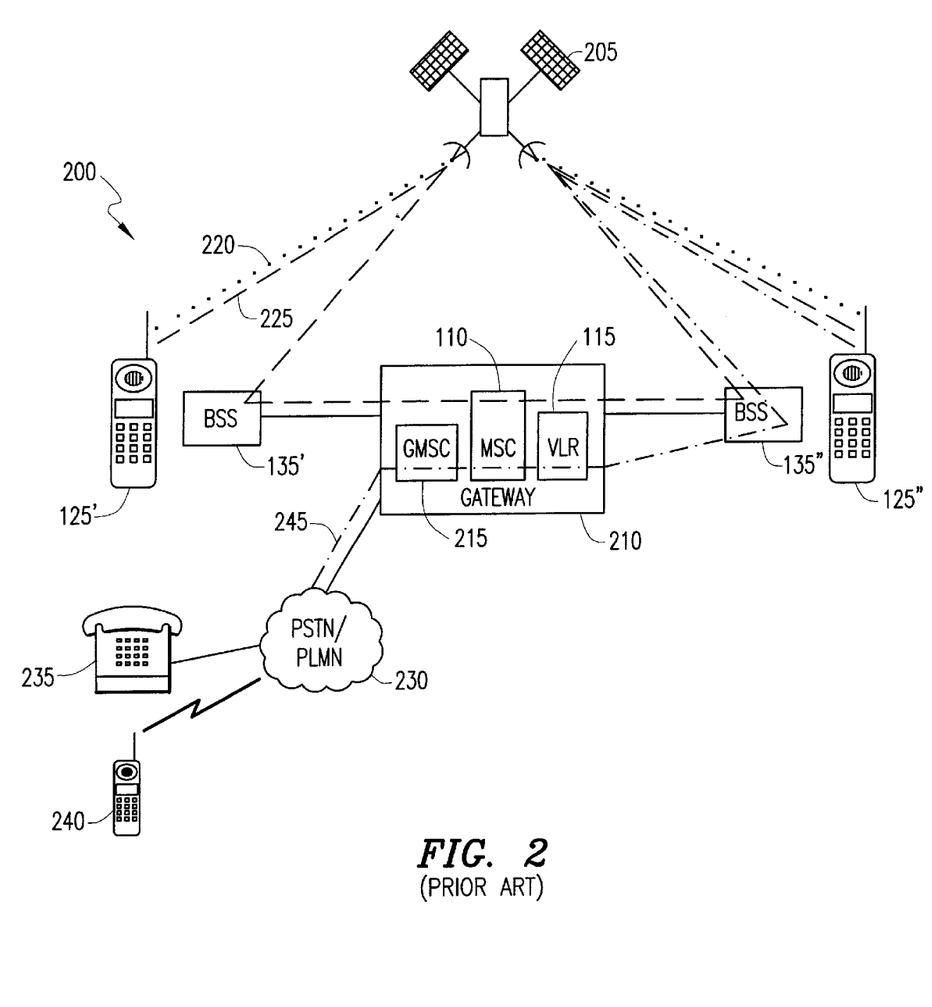
FIG. 2 illustrates an exemplary satellite-based wireless network system with three transmission paths identified.

Referring now to FIG. 2, an exemplary satellite-based wireless network system with three transmission paths identified is illustrated generally at 200. The satellite-based wireless network system 200 indicates how the GSM standard may be incorporated into a general (e.g., regional) satellite-based wireless network system. An MT 125' is in communication with an MT 125" via a satellite 205. The satellite-based wireless network system 200 also includes a satellite Base Station Subsystem (BSS) 135' connected to a satellite gateway 210, which is also connected to another satellite BSS 135". The gateway 210 may include a Gateway MSC (GMSC) 215, an MSC 110, and a VLR 115. It should be noted that neither any two nor all of the GMSC 215, the MSC 110, and the VLR 115 need be located at the same geographical location and that the gateway 210 need not include any of them. A transmission 220, which is represented by a dotted line, shows a transmission path between the MT 125' and the MT 125" that does not include the MSC 110 (e.g., a single hop in the satellite-based wireless network system 200). On the other hand, a transmission 225, which is represented by a dashed line, shows a transmission path between the MT 125' and the MT 125" that does include the MSC 110 (e.g., a double hop in the satellite-based wireless network system 200).

Also in FIG. 2 (although not necessarily an integral part of the satellite-based wireless network system 200), a Public Switched Telephone Network (PSTN)/PLMN 230 is illustrated. The PSTN/PLMN 230 is in communication with wireline terminals 235 and wireless terminals 240 as well as the gateway 210. A transmission 245, which is represented by a dashed and dotted line, shows a transmission path between a wireline terminal 235 or a wireless terminal 240 and the MT 125" from, or through, the PSTN/PLMN 230.

One of the principle benefits of satellite-based wireless network systems is the large geographic areas that may be covered by a single homogenous system. Consequently, these large coverage areas may span across long-distance zones or even the borders of one or more countries. Each of these satellite-based wireless network systems typically has more than one satellite gateway 210, each of which serves as a nexus between the particular satellite-based wireless network system and one or more external communication systems such as PSTNs, other PLMNs, the Internet, etc. The path through which a call is routed from a satellite subscriber (e.g., the satellite subscriber associated with the MT 125') or an external subscriber (e.g., a subscriber associated with the wireline terminal 235 and/or the wireless terminal 240) to another satellite subscriber (e.g., the satellite subscriber associated with the MT 125") usually traverses a gateway 210.

A satellite MT (e.g., the MT 125' or the MT 125") may be registered or re-registered (e.g., permanently or temporarily assigned within the satellite-based wireless network system 200) to a particular gateway 210, which then serves as the nexus through which the satellite MT sends and receives communications. The respective geographic location(s) of the gateway 210 of the satellite MT and a party (or their registered gateway 210) calling or being called by the satellite MT are therefore determinative of whether the call is of the long-distance or international variety, which usually cause the total cost of the call to escalate dramatically. When the gateway registration or re-registration process is effectuated without the knowledge of the associated satellite subscriber, the cost of calls becomes indeterminate and unpredictable from the perspective of the subscriber. This indeterminate and unpredictable cost condition is undesirable inasmuch as most subscribers are dissatisfied to discover unexpected charges on their service subscription invoices.

SUMMARY OF THE INVENTION

These indeterminate and unpredictable cost deficiencies of the prior art are overcome by the method and system of the present invention. For example, as heretofore unrecognized, it would be beneficial to optimize the completion of calls so as to prevent unexpected charges from appearing on the bills of satellite subscribers. In fact, it would be beneficial if incoming calls that would otherwise cause unexpected long distance/international charges to be incurred were completed so as to avoid such charges (e.g., by re-registering the incoming call).

The method and system of the present invention enable optimal call routing in a satellite communications network when a satellite subscriber has, for example, call forwarding, call transfer, etc. active. Many satellite networks will re-register a satellite subscriber (e.g., move the subscriber's VLR data) to another satellite gateway that is more, if not the most, cost efficient when the satellite subscriber initiates a call. If the called party is distant from the satellite subscriber's home country, the gateway to which the re-registration occurs is likely to be far from the gateway of his or her native country. Call forwarding, of course, is often directed to a number that is local to the satellite subscriber's home country (e. c, the call forwarding is directed to work or to home).

As a result of, for example, a call forwarding activation in conjunction with a re-registration to a distant gateway upon the initiation of a call by the satellite subscriber, an incoming call to the satellite subscriber will cause unexpected charges to appear on the satellite subscriber's bill absent application of the teachings of the present invention. In accordance with the principles of the present invention, however, any and all of several exemplary embodiments prevent the unexpected charges from appearing on the bill of the satellite subscriber.

For example, the satellite network may route the incoming call as if it originated within a PSTN/PLMN and thus suppress the normal re-registration of the other satellite subscriber that initiated the incoming call. Suppressing such re-registration results in the incoming call being routed as if it were a normal PSTN/PLMN call to the called satellite subscriber; this may trigger certain embodiments of the invention. Alternatively, satellite gateways and satellite control system (SCS) nodes may be modified such that they are able to re-register a calling satellite subscriber to the home/originating gateway of the called satellite subscriber. This re-registration in turn causes certain embodiments of the invention to be triggered in the most efficient manner. Additionally, the satellite network may communicate with one or more nodes in an Intelligent Network (IN), which is typically provided with adequate programming and data to determine a least expensive route and/or to calculate the cost of the expected/predicted routing. This charge is then applied to the bill of the subscriber of the satellite MT in lieu of long distance/international type charges.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (hardware, software, firmware, etc.), etc. are omitted so as not to obscure the description of the present invention with unnecessary detail.

A preferred embodiment of the present invention and its advantages are best understood by referring to FIGS. 1–7 of the drawings, like numerals being used for like and corresponding parts of the various drawings.

Aspects of GSM-based regional satellite communications systems are used to describe preferred embodiment(s) of the present invention. However, it should be understood that the principles of the present invention are applicable to other satellite-based wireless network systems (based on GSM or other wireless network standards) especially those in which call routing may be advantageously optimized.

As discussed generally in greater detail hereinbelow, regional satellite communications system call optimization enables the node(s) of the satellite system to analyze the dialed digits of the B-number for a satellite MT-originated call to determine the best satellite gateway to handle the call.

In general, this is the gateway closest to the called B-number. This support applies to calls to both wireline terminals and GSM MTs, among others. Furthermore, this functionality is also used to support single hop mobile-to-mobile calls within some regional satellite communications systems.

As also discussed in greater detail hereinbelow, certain aspects of the present invention are based on the GSM Standard 03.79 entitled "Support of Optimal Routing", specifically Section 6.2 entitled "Late call forwarding". The present invention addresses, among other situations, incoming calls from a PSTN or a PLMN that are non-optimized calls to a regional satellite network and are routed to the GMSC identified by the Mobile Station International ISDN Number (MSISDN) subscriber region. The satellite gateway that is associated with the GMSC that is identified by a satellite MT's MSISDN may be considered a home or original gateway to which the satellite MT is originally registered. It should be emphasized that while preferred embodiment(s) may be described in relation to particular aspects of regional satellite systems, the present invention is not so limited.

Implementation of the present invention in conjunction with a regional satellite network system is aided by the deployment of GSM 03.79, "Optimal routeing with late call forwarding", in the cooperating GSM PLMN networks and by the modification of the MSC/VLR, GMSC, HLR, and SCS nodes of the satellite network system. Furthermore, it should be understood that the present invention, if implemented with particular regional satellite communications systems, permits the addition of a Mobile Application Part (MAP) interface between the SCS node and the MSC/VLR, GMSC, and SCS nodes to support the Resume Call Handling (RCH) MAP message. It should be additionally recognized that registration and re-registration of the subscriber's satellite MT increases call setup time and adds signaling capacity load onto the regional satellite network.

Figure 3:
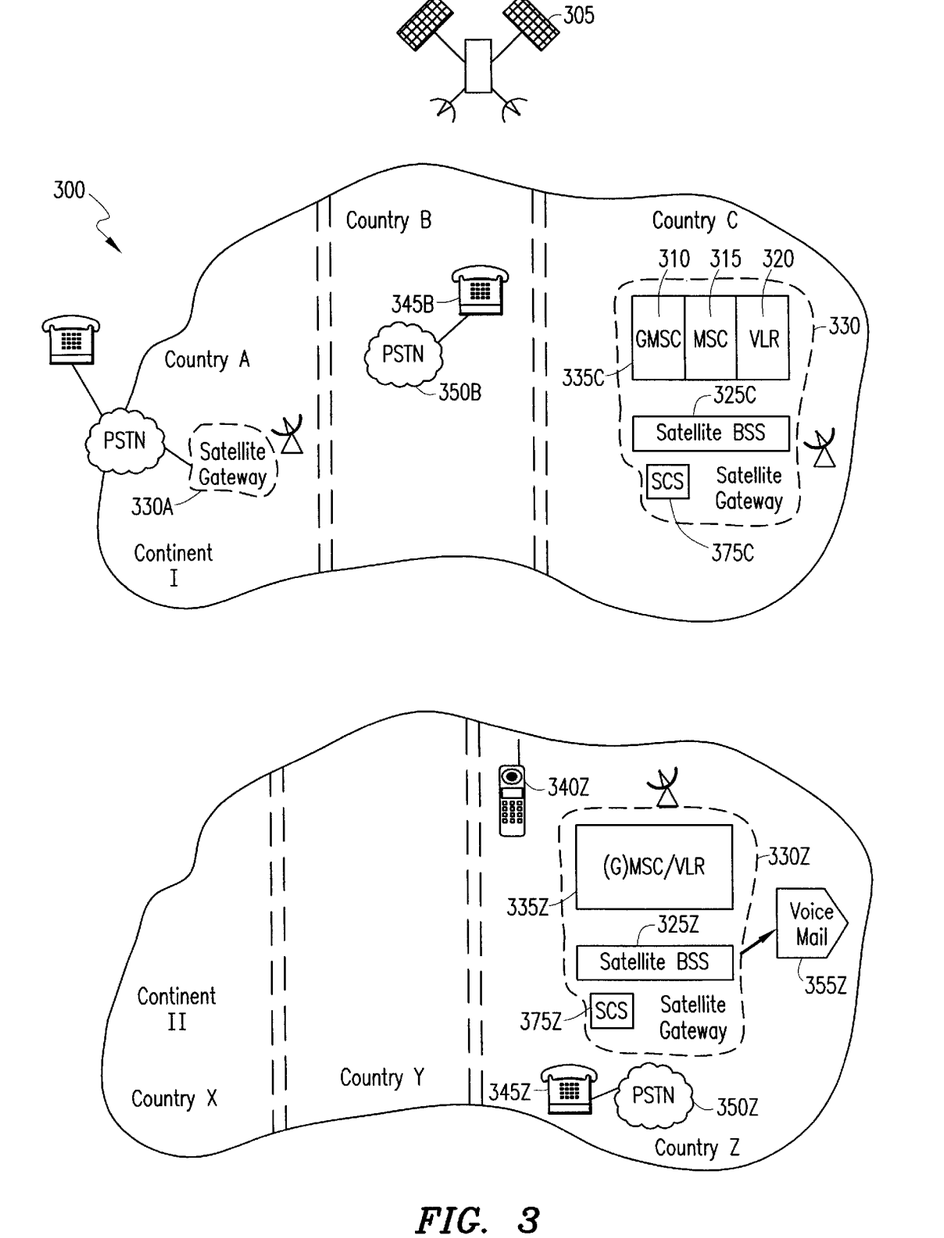
FIG. 3 illustrates an exemplary satellite communications system in accordance with the present invention.

Referring now to FIG. 3, an exemplary satellite communications system in accordance with the present invention is illustrated generally at 300. The satellite communications system 300 covers at least portion(s) of Countries A, B, and C in Continent I and Countries X, Y, and Z in Continent II. Satellite 305 enables communication between and among various communications stations in the satellite communications system 300. GSM-based satellite systems typically employ GMSC 310, MSC 315, and VLR 320 nodes which are connected to a satellite BSS 325. Often, all those entities are located in one geographical location, referred to herein as a satellite gateway 330, or simply gateway 330. The GMSC 310, MSC 315, and VLR 320 nodes, when co-located in one single node, are referred to herein as a (G)MSC/VLR 335. Also shown are satellite control system (SCS) nodes 375, which will be described in greater detail hereinbelow. It should be understood that the principles of the present invention are equally applicable regardless of whether or not these nodes are Column-located at one geographical location.

The satellite BSS 325 of one satellite gateway 330 can communicate with the satellite BSS 325 of all other satellite gateways 330. Thus, it is possible for every satellite gateway 330 to handle any (satellite) MT inside the entire coverage area of the satellite system 300. This allows for the re-registration of a (satellite) MT during call set-up to an optimal gateway 330. A gateway 330 may be optimal, for example, if the terrestrial resources needed for the call are minimal (e.g., as measured by cost, etc.).

For example, the satellite communications network system 300 spans over Continent I and Continent II. Gateway stations 330 are in Countries A, C, and Z. A satellite subscriber 340Z is located in the Country Z and calls a number 345B in the Country B. The satellite system 300 may first re-register the subscriber 340Z (or, more precisely, re-register the MT of the subscriber 340Z by, e.g., moving the subscriber's 340Z VLR data) to the gateway 330A in the Country A before the call is set-up (e.g., if the call leg from the gateway 330A in the Country A to the Country B is less costly than the call leg from the gateway 330Z in the Country Z to the Country B). This re-registration from the home/original gateway 330Z of the subscriber 340Z may be effectuated without the knowledge of the subscriber 340Z so that the satellite network system provider benefits from the cost reduction with or without sharing any of the cost savings with the subscriber 340Z.

However, this call optimization unfortunately also has disadvantages, which the present invention advantageously remedies. Assume, for instance, that satellite subscriber 340Z has call forwarding active to a number 345Z in the Country Z, which is her/his home country. The subscriber 340Z is subsequently involved in a call for which she/he is re-registered to a distant gateway 330 in another country (e.g., the gateway 330A in the Country A). If the subscriber 340Z now receives a call which results in call forwarding, the forwarded call will be international as it is routed from the point of satellite registration, namely the gateway 330A, over terrestrial communication system(s) to the PSTN 350Z and then to the forwarded-to number 345Z. The forwarding subscriber 340Z may not be willing to pay for the international call because the international call charges do not result from her/his direct actions or choices. Furthermore, not only may the re-registration process be unknown to the subscriber 340Z, but in any event the forwarded leg is unpredictable because it depends on the gateway 330 to which the forwarding subscriber 340Z has been re-registered as a result of the dialed number 345B.

In case of calls from a PSTN (e.g., from a subscriber 345B through a PSTN 350B) or some PLMN (not specifically shown in FIG. 3) to a satellite subscriber 340 such as the subscriber 340Z, the "Support of Optimal Routeing (SOR)" GSM Technical Specification (02.79 (Nov. 1996, Version 5.1.0) and 03.79 (Version 5.4.0, Release 1996)) may be relied on for call optimization. For example, unnecessary international call legs can be avoided by dropping the call back to the GMSC 310 using the MAP operation RCH.

In case of calls from one satellite MT 340 to another satellite MT 340 inside the same satellite network 300, the calling subscriber may be re-registered to the (G)MSC/VLR 335 in the gateway 330 in which the called party is registered. A drop-back of the call to the GMSC 310 will not be useful in this situation inasmuch as the GMSC 310 and the MSC/VLR 315/320 are Column-located in the same physical location. The present invention advantageously also enables optimal call routing with call forwarding for calls between satellite subscribers 340 inside the same satellite network 300.

For calls that originate and terminate within the same satellite network 300, a new information element, called a Satellite Call Reference (SCR) herein, shall be sent by the originating satellite BSS 325 towards the terminating side. As mentioned hereinabove, every satellite BSS 325 can usually communicate with every other satellite BSS 325. This communication ability enables the terminating satellite BSS 325 to contact the originating satellite BSS 325 regarding the call for purposes of optimizing the call completion (e.g., for call routing or (re-)registration). In other words, and by way of example only, the call may be optimally completed by routing the transmission path appropriately or re-registering the calling satellite subscriber (or, more precisely, the satellite MT) to an appropriate gateway. This example, as well as additional embodiments, are explained further hereinbelow with reference to FIG. 4.

As further illumination of one aspect of the present invention, a (G)MSC/VLR 335 that is to establish a call route proceeds with the call establishment until the (G)MSC/VLR 335 encounters call forwarding (e.g., conditional call forwarding). When call forwarding is encountered, the (G)MSC/VLR 335 performs an analysis of the forwarded-to number to determine if (i) the call should be forwarded or (ii) the MAP message RCH should be sent. If the MAP message RCH is to be sent, the (G)MSC/VLR 335 first determines whether or not the calling party and called party are both registered within the same gateway node 330. If not, the MAP RCH is sent towards the GMSC from which the call request (e.g., Initial Address Message (IAM)) was received. Alternatively, this case may also be handled similarly to the case in which both satellite subscribers 340 are registered in the same gateway 330, which is explained next.

If both parties are registered in the same gateway 330, the MAP message RCH is sent to the satellite BSS 325 identified in the SCR. In response to the MAP message RCH, the identified (which is also the originating) satellite BSS 325 initiates a normal call disconnection over BSSMAP (e.g., on the originating side) and performs an analysis of the forwarded-to number in order to determine the optimal gateway 330 through which the forwarded call should be completed (e.g., via routing or re-registration). The originating satellite BSS 325 correlates the original call with the forwarding call request received in the MAP message RCH using the SCR received in the RCH message. The nodal address of the satellite BSS 325 and the SCR of the call is then sent to the MSC/VLR 315/320 as part of the call establishment information. Advantageously, the present invention properly handles both unconditional call forwarding (e.g., as determinable at the GMSC) and conditional call forwarding (e.g., as determinable at the MSC/VLR).

In another embodiment, the present invention optimally handles cases in which (i) the called party has unconditional call forwarding (CFU) active or (ii) call forwarding not reachable (CFNR) needs to be triggered as a result of the called subscriber not being attached (e.g., as detectable by the terminating MSC/VLR) or not registered in any VLR (e.g., as detectable by the HLR). In particular regional satellite communications systems, the satellite BSS on the originating side may query the location of the called party using a MAP message Any Time Interrogation (ATI) in order to determine if and where the originating subscriber needs to be re-registered for an optimized call routing. In case CFU or CFNR (for the two cases mentioned above) needs to be triggered for the terminating subscriber, the HLR includes this information along with the forwarded-to number in the ATI response. The querying satellite BSS is then able to analyze the new destination and, if the forwarded-to number indicates a mobile subscriber, launch an ATI query towards the HLR indicated by the new number. Advantageously, the probability of multiple subsequent re-registrations is thereby reduced.

Figure 4:
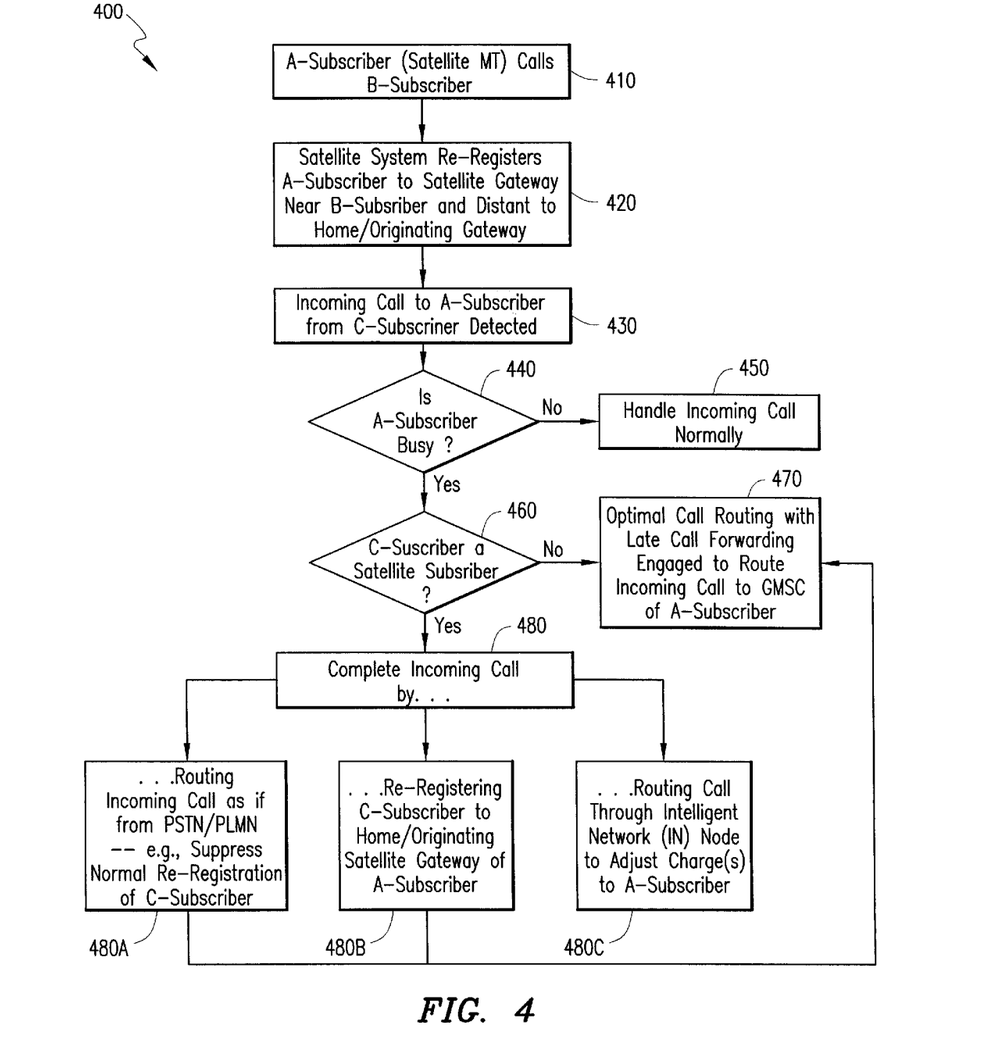
FIG. 4 illustrates a method in flowchart form for completing an incoming call in accordance with the present invention.

Referring now to FIG. 4, a method in flowchart form for completing an incoming call in accordance with the present invention is illustrated generally at 400. In the flowchart 400, an A-subscriber of a satellite MT is engaging in a phone call with a B-subscriber, which may or may not be a satellite subscriber, when a C-subscriber calls the A-subscriber. The flowchart indicates multiple embodiments depending, inter alia, on whether the C-subscriber is a satellite subscriber or not. Initially, the A-subscriber (of the satellite MT) calls the B-subscriber (Step 410). The satellite system re-registers the A-subscriber to a satellite gateway that is near the B-subscriber and (potentially) distant from the home/original gateway of the A-subscriber (Step 420). Subsequently, during the call from the A-subscriber to the B-subscriber, an incoming call to the A-subscriber from the C-subscriber is detected by the satellite network (Step 430). The satellite network determines whether the A-subscriber is busy (at Step 440). If not busy, the incoming call from the C-subscriber to the A-subscriber is handled normally (Step 450).

If, on the other hand, the A-subscriber is busy (as detectable at Step 440) (and as the A-subscriber would be if the call to the B-subscriber is still ongoing), then the satellite network determines whether the C-subscriber is a satellite subscriber (at Step 460). If not, optimal call routing with late call forwarding is engaged in order to route the incoming call to the GMSC of the home/original gateway of the A-subscriber (Step 470). If, on the other hand, the C-subscriber is a satellite subscriber (as detectable at Step 460), then the incoming call from the C-subscriber may be completed (Step 480) by the satellite network via any of three (3) exemplary embodiments (Steps 480A, 480B, and/or 480C).

In one embodiment, the incoming call from the C-Subscriber may be completed by routing the call as if it were originating from an external PSTN/PLMN (Step 480A). As a result, normal re-registration of the C-subscriber to the gateway near the B-subscriber, to which the A-subscriber is currently re-registered, may be suppressed. This eliminates the indeterminate and unpredictable call charging, especially in conjunction with the engagement of optimal call routing with late call forwarding, which routes the incoming call to the GMSC of the home/original gateway of the A-subscriber (as discussed in greater detail hereinabove in connection with Step 470). In another embodiment, the incoming call may be completed by re-registering the C-subscriber to the home/original satellite gateway of the A-subscriber (Step 480B). Consequently, no unexpected long distance charges are incurred by routing a call from a distant satellite gateway to the home/original satellite gateway because the call "begins" at (via the re-registration to) the home/original satellite gateway of the A-subscriber. It should be noted that optimal call routing with late call forwarding also applies in this embodiment.

In yet another embodiment, the incoming call is completed by routing it through an IN node so that the IN node may adjust charge(s) to the A-subscriber (Step 480C). The IN node may calculate what the charges "should have been" (e.g., the charges that would have accrued but for the re-registration of the A-subscriber for the initial call to the B-subscriber (in Step 420)), and the satellite network service provider may thereafter adjust the billing of the A-subscriber accordingly. This embodiment does have a disadvantage in that the satellite network service provider may have to pay for the difference between the actual costs (with the long distance charges from the re-registered gateway) and the billed costs (without the long distance charges being billed to the satellite subscriber).

As alluded to hereinabove, the SCS typically examines a satellite subscriber's dialed number in order to decide whether or not to re-register the satellite subscriber when the satellite subscriber initiates a call to the dialed number. In accordance with the principles of the present invention, the SCS nodes, along with the other nodes associated with satellite gateways, may be modified such that the Call Data Record (CDR) includes the SCR and associates the calling record so that the satellite subscriber (the A-Subscriber of the flowchart 400) is not charged. However, the complexity of such a scheme is relatively high.

Therefore, while the SCS nodes may be made capable of optimally completing an incoming call to an A-subscriber that is currently busy and has call forwarding active, it may be more efficient to rely on the IN. Thus, the call completion and/or the charging amount decision(s) can be transferred to an IN node. In other words, instead of dropping the call back to an SCS node, the call is dropped back to a geographically fixed node, such as an IN node (e.g., a Service Switching Point (SSP) or Service Control Point (SCP)). One resulting benefit is that the costs are fixed based on the routing or deterministic charging information of the IN. The GSM standardized IN, the Customized Applications for Mobile network Enhanced Logic (CAMEL) IN, may have a lookup table with charges corresponding to call forwarding for a subscriber or for groups of subscribers. The IN may consider, for example, what the satellite subscriber would pay if the call were routed normally, what the approximate cost would be for a fixed line call, etc. Thus, the satellite subscriber can be billed according to predictable expectations, regardless of the actual costs to the satellite network provider.

When a satellite gateway determines that there is a need to send an RCH message (as explained in greater detail hereinbelow with reference to FIGS. 5–7), the satellite gateway transmits the RCH message. If the satellite gateway detects that the RCH message has been received by itself, then the call routing/charging decision may be forwarded to the IN. Otherwise, the RCH message prompts the call routing to continue as it would normally under GSM. In the SCS embodiment, the SCS, HLR, and GMSC nodes in the ground segment are modified. It is further advantageous to utilize the Optimal Routing Late Call forwarding as per GSM Technical Specifications 03.79 (e.g., support it in the HLRs of the roaming partners of the satellite network, as a minimum.)

The present invention advantageously works for all conditional and unconditional call forwarding traffic cases and may be used in conjunction with the GSM standard implementation of Optimal Routing with late forwarding (e.g., GSM 03.79). In one embodiment, the present invention is based on the assumption that the least-cost forwarding/transferring call leg is from the GMSC of the satellite network subscriber identified by the HLR ID in the MSISDN (e.g., the HLR associated with the home/original satellite gateway of the satellite network subscriber). Regardless, determining call charges based on the GMSC associated with the home/original satellite gateway generally matches the cost expectations of the satellite subscriber, which thereby eliminates surprise charges on the subscriber's satellite service invoice.

Figure 5:
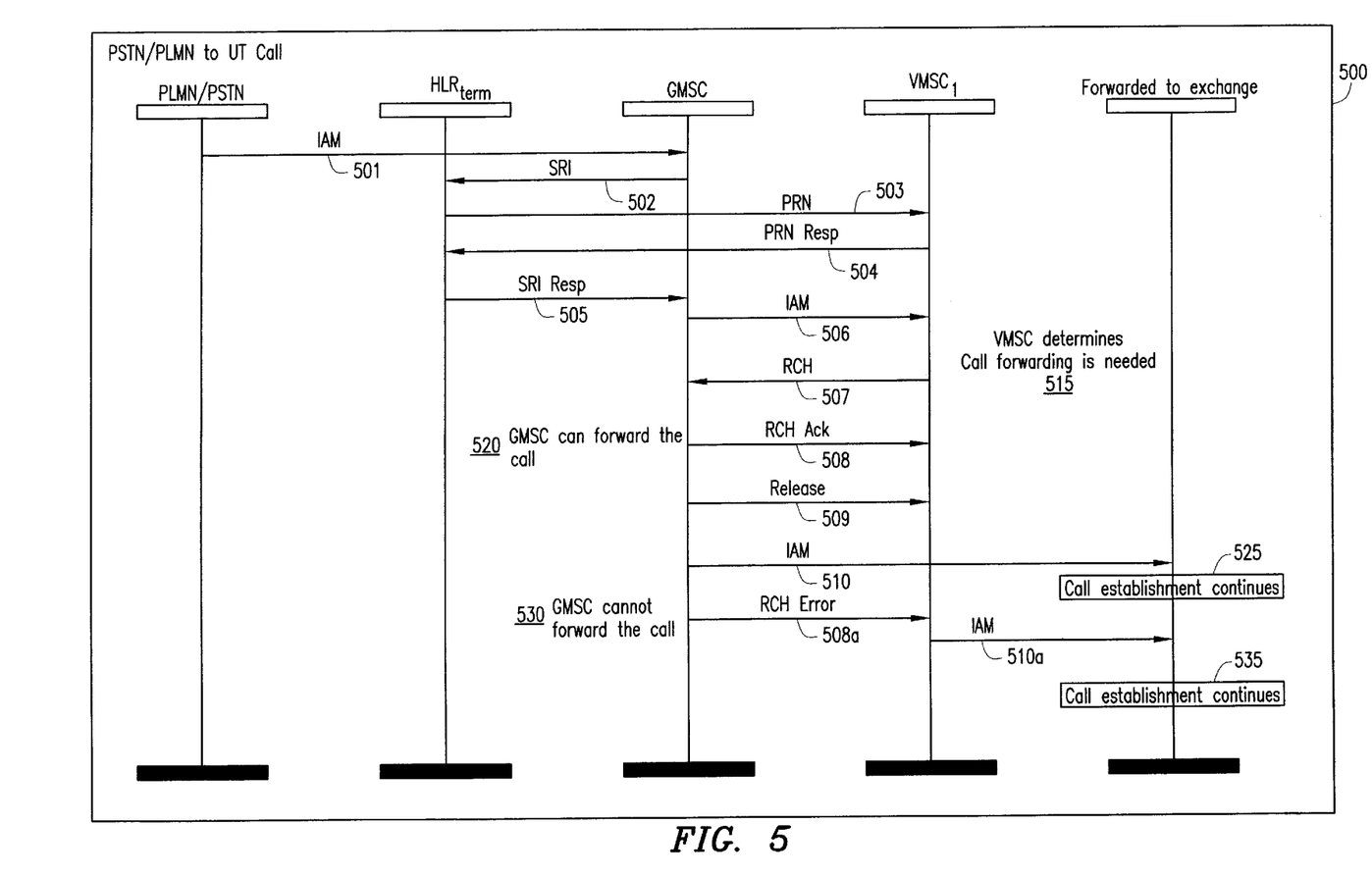
FIG. 5 illustrates a sequence diagram that is related to the present invention.

Referring now to FIG. 5, a sequence diagram that is related to the present invention is illustrated generally at 500. In this example as represented by the sequence diagram 500, calls to a satellite MT that originate in a PSTN or PLMN are optimally completed. The incoming calls to the satellite MT arrive at the GMSC from the PLMN/PSTN. When the incoming call (e.g., the IAM 501) is received, the GMSC performs a Send Routing Information (SRI) message 502, which includes both the GMSC address and the call reference, to query the HLR. The HLR requests (via the MAP message Provide Roaming Number (PRN) 503) from the called satellite subscriber's VMSC the provision of a roaming number. The PRN message 503 also contains the address of the GMSC and the call reference number.

The roaming number, which is received in a PRN response message 504, is transferred to the HLR. The HLR thereafter transmits an SRI response message 505 to the GMSC with the roaming number. The MSC/VLR receives the IAM (Integrated Services Digital Network (ISDN) User Part/Telephone User Part (ISUP/TUP)) 506 with the Mobile Subscriber Routing Number (MSRN). The MSC/VLR may then determine if the call should be forwarded (e.g., because the called satellite subscriber is busy, is not reachable, has not replied to the call request, etc.). However, the MSC/VLR first analyses the forwarded-to number to determine if the call should be forwarded directly from the MSC/VLR node. If not, and therefore call forwarding away from the VMSC is needed at 515, a MAP RCH message should be sent to the GMSC to resume call handling. The MAP RCH message 507 contains forwarding data, basic service information, and the call reference number.

In response to the RCH message 507, the MSC/VLR may receive a positive acknowledgment (e.g., via a MAP RCH Ack message 508) to the resume call handling request 507 if the call is to be optimally completed by the GMSC (e.g., the GMSC is able to forward the call at 520). In addition, a Release message 509 (ISUP/TUP) is also received at the VMSC from the GMSC in order to release the traffic circuit. Thereafter, the GMSC may transmit an IAM 510 to the exchange to which the call is to be forwarded, so the call establishment continues at 525. If, on the other hand, the GMSC cannot forward the call properly at 530, the GMSC sends to the VMSC an RCH error message 508a that so indicates. The VMSC may consequently continue the call establishment process at 535 by sending an IAM 510a to the forwarded-to exchange. If the call is released as a result of a received negative acknowledgment, the call may be disconnected, optionally with the playing of an announcement.

If the incoming call is a MT to MT call and both MTs are registered in the same GMSC, the scheme is different because there is no GMSC to which the call can be dropped back to since the Interrogating GMSC will be in the Visitor PLMN. To resolve this situation, the MSC/VLR/GMSC proceeds with the call establishment until a call forwarding (e.g., unconditional or conditional) is encountered. When call forwarding is encountered, the MSC/VLR/GMSC performs an analysis of the forwarded-to number to determine if (i) the call should be forwarded or (ii) the MAP RCH message should be sent. If the RCH message should be sent (as described in greater detail hereinbelow with reference to messages 607 and 706 in FIGS. 6 and 7, respectively), then the RCH message is sent to the SCS node with an MT-MT SCR and a (new) SCS address that is received as part of the satellite call establishment (in an exemplary embodiment). In response to the RCH message, the SCS initiates a normal call disconnection over BSSMAP in the current MSC/VLR and performs an analysis of the forwarded-to number in order to determine the optimal gateway for the forwarded call. Advantageously, this approach works for both unconditional call forwarding (e.g., as detectable at the GMSC) and conditional call forwarding (e.g., as detectable at the MSC/VLR).

Figure 6:
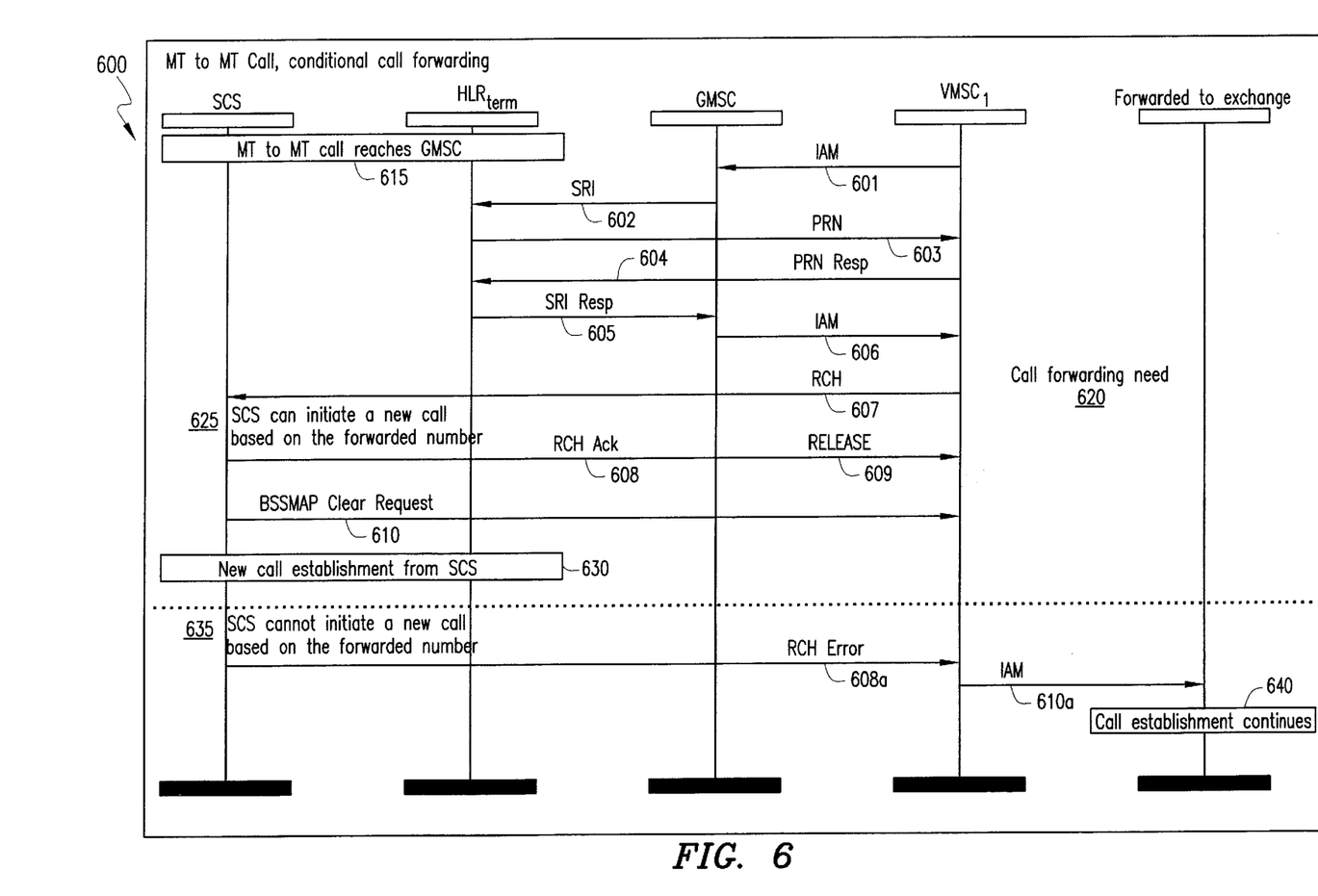
FIG. 6 illustrates a sequence diagram in accordance with the present invention.

Referring now to FIG. 6, a sequence diagram in accordance with the present invention is illustrated generally at 600. In this embodiment as represented by the sequence diagram 600, call forwarding is conditionally activated. An MT to MT call reaches the GMSC at 615 via the IAM 601. The GMSC, as a result, transmits an SRI message 602 that includes an SCR to the HLR. The HLR thereafter sends a PRN message 603, which also includes the SCR, to the VMSC. In response thereto, the VMSC sends a PRN response message 604 back to the HLR. Now supplied with the information to complete the call from the VMSC, the HLR transmits an SRI response message 605 to the GMSC. The GMSC thereafter sends an IAM 606 to the VMSC.

The VMSC determines that call forwarding is needed at 620 (e.g., the satellite subscriber is currently not reachable). Consequently, the VMSC transmits an RCH message 607 that includes the SCR to the SCS node so that the SCS node can initiate a new call based on the forwarded-to number at 625. The SCS node, however, first responds with both an RCH acknowledge message 608 and a release message 609 that are sent to the VMSC. Furthermore, the SCS node also sends a BSSMAP clear request message 610 to the VMSC. The SCS node may then continue with a new call establishment procedure at 630 (e.g., by performing one of the Steps 480A, 480B, and 480C of FIG. 4) using the SCR. If the SCS node cannot initiate a new call based on the forwarded-to number at 635, the SCS node sends an RCH error message 608a to the VMSC. The VMSC is therefore responsible for continuing the call establishment procedure at 640, and the VMSC does so by sending an IAM 610a to the forwarded-to exchange.

Figure 7:
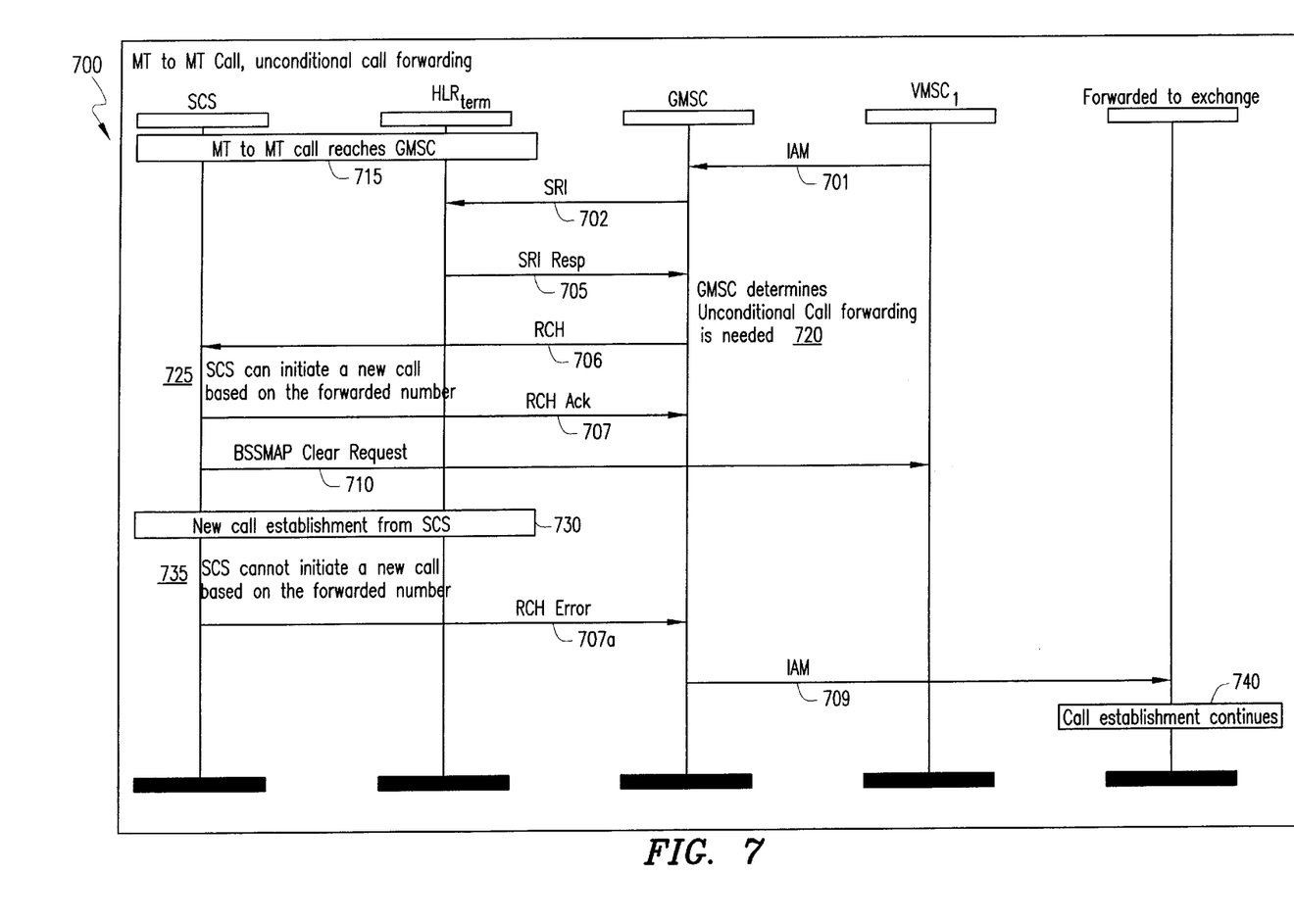
FIG. 7 illustrates another sequence diagram in accordance with the present invention.

Referring now to FIG. 7, another sequence diagram in accordance with the present invention is illustrated generally at 700. In this embodiment as represented by the sequence diagram 700, call forwarding is unconditionally activated. An MT to MT call reaches the GMSC at 715 via the IAM 701. The GMSC, as a result, transmits an SRI message 702 that includes an SCR to the HLR. Because the call forwarding is unconditional, and the HLR is therefore aware that call forwarding is currently in effect, the HLR transmits an SRI response message 705 to the GMSC.

The GMSC determines that (unconditional) call forwarding is needed at 720 (e.g., the satellite subscriber is not accepting any calls). Consequently, the GMSC transmits an RCH message 706 that includes the SCR to the SCS node, so that the SCS node can initiate a new call based on the forwarded-to number at 725. The SCS node responds with an RCH acknowledge message 707 that is sent to the GMSC. Furthermore, the SCS node also sends a BSSMAP clear request message 708 to the VMSC. The SCS node may then continue with a new call establishment procedure at 730 (e.g., by performing one of the Steps 480A, 480B, and 480C of FIG. 4) using the SCR. If the SCS node cannot initiate a new call based on the forwarded-to number at 735, the SCS node sends an RCH error message 707a to the GMSC. The GMSC is therefore responsible for continuing the call establishment procedure at 740, and the GMSC does so by sending an IAM 709 to the forwarded-to exchange.

Although preferred embodiment(s) of the method and system of the present invention have been illustrated in the accompanying Drawings and described in the foregoing Detailed 10 Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method in a satellite communications network for ensuring that a satellite subscriber is properly charged, comprising the steps of:

re-registering a satellite mobile terminal to a distant gateway away from a home gateway of said satellite mobile terminal as a result of an outgoing call from said satellite mobile terminal;

identifying an incoming call directed to said satellite mobile terminal from another terminal;

determining whether said satellite mobile terminal is busy;

responsive to a negative determination that said satellite mobile terminal is busy:
handling said incoming call normally; and responsive to an affirmative determination that said satellite mobile terminal is busy:
determining whether said another terminal is of a satellite mobile terminal type; and
if so, implementing a procedure so as to complete said incoming call such that a subscriber associated with said satellite mobile terminal is not charged unexpectedly.

2. A satellite communications network that ensures that a satellite subscriber is properly charged when re-registration has occurred, comprising the steps of:

means for re-registering a satellite mobile terminal to a distant gateway away from a home gateway of said satellite mobile terminal responsive to an outgoing call from said satellite mobile terminal;

means for identifying an incoming call directed to said satellite mobile terminal from another terminal;

means for determining whether said satellite mobile terminal is busy;

means, responsive to a negative determination that said satellite mobile terminal is busy by said means for determining whether said satellite mobile terminal is busy, for handling said incoming call normally; and means, responsive to an affirmative determination that said satellite mobile terminal is busy by said means for determining whether said satellite mobile terminal is busy, for determining whether said another terminal is of a satellite mobile terminal type, and if so, for activating means for implementing a procedure so as to complete said incoming call such that a subscriber associated with said satellite mobile terminal is not charged unexpectedly.

3. The satellite communications network according to claim 2, wherein said means for determining and for activating activates means for engaging optimal call routing with late call forwarding to route said incoming call to said home gateway of said satellite mobile terminal if it is determined that said another terminal is not of a satellite mobile terminal type.

4. The satellite communications network according to claim 2, wherein said means for implementing a procedure comprises means for routing said incoming call as if said incoming call originated from a public switched telephone network (PSTN) or a public land mobile network (PLMN).

5. The satellite communications network according to claim 2, wherein said means for implementing a procedure comprises means for routing said incoming call through an intelligent network (IN) node to calculate charges.

6. The satellite communications network according to claim 2, wherein said means for implementing a procedure comprises means for re-registering said another terminal to said home gateway of said satellite mobile terminal.

* * * * *

UNITED STATES PATENT AND TRADEMARK OFFICE
CERTIFICATE OF CORRECTION

PATENT NO. : 6,438,355 B1
DATED : August 20, 2002
INVENTOR(S) : Inayat Syed et al.

It is certified that error appears in the above-identified patent and that said Letters Patent is hereby corrected as shown below:

Column 3,
Line 40, replace "(e.c," with -- (e.g, --

Column 11,
Line 56, replace "Detailed 10 Description," with -- Detailed Description, --

Signed and Sealed this

Eighteenth Day of February, 2003

JAMES E. ROGAN
*Director of the United States Patent and Trademark Office*